United States Patent
Umehara

(10) Patent No.: US 10,062,921 B2
(45) Date of Patent: Aug. 28, 2018

(54) ELECTRODE BODY AND ELECTRODE BODY MANUFACTURING METHOD

(71) Applicant: TOYOTA JIDOSHA KABUSHIKI KAISHA, Toyota-shi, Aichi-ken (JP)

(72) Inventor: Masakazu Umehara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 210 days.

(21) Appl. No.: 14/971,172

(22) Filed: Dec. 16, 2015

(65) Prior Publication Data

US 2016/0181652 A1 Jun. 23, 2016

(30) Foreign Application Priority Data

Dec. 19, 2014 (JP) .................. 2014-257730

(51) Int. Cl.
| | |
|---|---|
| *H01M 10/04* | (2006.01) |
| *H01M 10/0525* | (2010.01) |
| *H01M 2/16* | (2006.01) |
| *H01M 4/139* | (2010.01) |
| *H01M 10/0587* | (2010.01) |

(52) U.S. Cl.
CPC ..... *H01M 10/0431* (2013.01); *H01M 2/1673* (2013.01); *H01M 4/139* (2013.01); *H01M 10/0525* (2013.01); *H01M 10/0587* (2013.01)

(58) Field of Classification Search
None
See application file for complete search history.

(56) References Cited

U.S. PATENT DOCUMENTS

| | | | | |
|---|---|---|---|---|
| 4,615,108 A | * | 10/1986 | Tomazic | ............... H01M 2/40 29/623.1 |
| 2002/0122977 A1 | | 9/2002 | Fujimatsu et al. | |
| 2004/0202928 A1 | | 10/2004 | Miyamoto et al. | |
| 2007/0204458 A1 | | 9/2007 | Fujita et al. | |
| 2013/0309566 A1 | | 11/2013 | Umehara | |

FOREIGN PATENT DOCUMENTS

| | | |
|---|---|---|
| CN | 1383586 A | 12/2002 |
| CN | 1525591 A | 9/2004 |
| JP | 2007242595 A | 9/2007 |
| JP | 2009252392 A | 10/2009 |
| JP | 2011-243351 A | 12/2011 |
| JP | 2013-080655 A | 5/2013 |
| KR | 1020130118971 A | 10/2013 |
| WO | 2012/101816 A1 | 8/2012 |

* cited by examiner

*Primary Examiner* — Lucas J. O'Donnell
(74) *Attorney, Agent, or Firm* — Sughrue Mion, PLLC

(57) ABSTRACT

An electrode body includes a positive electrode and a negative electrode. The positive electrode includes a positive electrode current collector and a positive electrode mixture layer disposed on the positive electrode current collector. The negative electrode includes a negative electrode current collector, a negative electrode mixture layer disposed on the negative electrode current collector and an insulation layer disposed on the negative electrode mixture layer and containing insulation particles. An insulation layer containing the insulation particles is formed on a side surface of width-direction end of the negative electrode so as to cover the side surface of the end portion.

8 Claims, 14 Drawing Sheets

FIG. 14

| | PRESENCE OR ABSENCE OF SHORT CIRCUIT AT THE TIME OF WELDING CURRENT COLLECTOR | PRESENCE OR ABSENCE OF SHORT CIRCUIT AT THE TIME OF CRUSHING | CAPACITY RETENTION RATE (%) |
|---|---|---|---|
| COMPARATIVE EXAMPLE | PRESENT | PRESENT | 89.0 |
| EXAMPLE 1 | ABSENT | PRESENT | 95.2 |
| EXAMPLE 2 | ABSENT | ABSENT | 88.7 |

ELECTRODE BODY AND ELECTRODE BODY MANUFACTURING METHOD

INCORPORATION BY REFERENCE

The disclosure of Japanese Patent Application No. 2014-257730 filed on Dec. 19, 2014 including the specification, drawings and abstract is incorporated herein by reference in its entirety.

BACKGROUND OF THE INVENTION

1. Field of the Invention

The invention relates to an electrode body and an electrode body manufacturing method and, more particularly, to an electrode body for use in a non-aqueous electrolyte secondary battery and an electrode body manufacturing method.

2. Description of Related Art

As one of non-aqueous electrolyte secondary batteries, there is a lithium-ion secondary battery. The lithium-ion secondary battery is a secondary battery which can be charged and discharged by allowing lithium ions in an electrolyte to move between a positive electrode and a negative electrode which store and release the lithium ions.

Japanese Patent Application Publication No. 2013-080655 (JP 2013-080655 A) discloses a technique regarding a non-aqueous electrolyte secondary battery which makes use of an electrode plate formed by coating an insulation layer on an electrode active material. In the non-aqueous electrolyte secondary battery disclosed in JP 2013-080655 A, a typical sheet-like separator is not used and an insulation layer is used as a separator. In the technique disclosed in JP 2013-080655 A, insulation particles are used as the particles that form the insulation layer.

In the case where the insulation particles are used in the insulation layer of the electrode body as in the non-aqueous electrolyte secondary battery disclosed in JP 2013-080655 A, the insulation layer is formed by directly coating the insulation particles on a negative electrode mixture layer. At this time, the side surface of the negative electrode mixture layer (namely, the side surface of the negative electrode) is kept exposed without being covered with the insulation layer. Therefore, a problem is posed in that if a load is applied to the electrode body, the exposed portion of the negative electrode is short-circuited by making contact with a positive electrode current collector.

FIG. 15 is a view for explaining a problem to be solved by the invention and is a top view illustrating the states of a positive electrode (hereinafter, it may be referred to as a positive electrode sheet) and a negative electrode (hereinafter, it may be referred to as a negative electrode sheet) available before an electrode body is wound. FIG. 16 is a sectional view taken along cut line XVI-XVI in the electrode body illustrated in FIG. 15. As illustrated in FIG. 15, an electrode body 101 includes a strip-shaped positive electrode sheet 110 and a strip-shaped negative electrode sheet 120. The positive electrode sheet 110 and the negative electrode sheet 120 are laminated in a thickness direction.

As illustrated in FIGS. 15 and 16, the positive electrode sheet 110 includes a positive electrode current collector 111 and positive electrode mixture layers 112 disposed on the positive electrode current collector 111 (namely, on the opposite surfaces of the positive electrode current collector 111). A positive electrode mixture layer non-forming portion 114, on which the positive electrode mixture layers 112 are not disposed, is provided in one width-direction end of the positive electrode sheet 110 (namely, at the upper side of the positive electrode sheet 110 illustrated in FIG. 15). Furthermore, the negative electrode sheet 120 includes a negative electrode current collector 121, negative electrode mixture layers 122 disposed on the negative electrode current collector 121 (namely, on the opposite surfaces of the negative electrode current collector 121), and insulation layers 123 disposed on the negative electrode mixture layers 122 and containing insulation particles. A negative electrode mixture layer non-forming portion 124, on which the negative electrode mixture layers 122 are not disposed, is provided in one width-direction end of the negative electrode sheet 120 (namely, at the lower side of the negative electrode sheet 120 illustrated in FIG. 15).

As illustrated in FIG. 16, the positive electrode sheet 110 and the negative electrode sheet 120 are disposed such that the positive electrode mixture layer non-forming portion 114 of the positive electrode current collector 111 and the negative electrode mixture layer non-forming portion 124 of the negative electrode current collector 121 are opposite to each other in the width direction. Furthermore, the width-direction ends of the positive electrode mixture layers 112 are disposed more inward in the width direction than the width-direction ends of the negative electrode mixture layers 122. At this time, the width-direction end 125 of the negative electrode 120 is disposed so as to overlap with the positive electrode mixture layer non-forming portion 114 of the positive electrode current collector 111 when seen in a plan view from the lamination direction of the positive electrode sheet 110 and the negative electrode sheet 120.

In this regard, when insulation particles are used as the insulation layers 123 of an electrode body 101, the insulation layers 123 are formed by directly coating the insulation particles on the negative electrode mixture layers 122. Therefore, the side surface of the end portions 125 of the negative electrode mixture layers 122 (namely, the side surface of the negative electrode 120) is kept exposed without being covered with the insulation layers 123. For that reason, if a load is applied to the electrode body 101 obtained by laminating the positive electrode 110 and the negative electrode 120, the end portions 125 of the negative electrode mixture layers 122 may make contact with the positive electrode mixture layer non-forming portion 114 of the positive electrode current collector 111 (as indicated by an arrow in FIG. 16). This poses a problem in that the positive electrode 110 and the negative electrode 120 are short-circuited.

SUMMARY OF THE INVENTION

The invention provides an electrode body and an electrode body manufacturing method which are capable of suppressing a short circuit between a positive electrode and a negative electrode even when an insulation layer is formed using insulation particles.

An electrode body for a non-aqueous electrolyte secondary battery according to a first aspect of the invention, includes: a positive electrode including a positive electrode current collector and a positive electrode mixture layer disposed on the positive electrode current collector; and a negative electrode including a negative electrode current collector, a negative electrode mixture layer disposed on the negative electrode current collector, and an insulation layer disposed on the negative electrode mixture layer, the insulation layer containing insulation particles, and the positive electrode and the negative electrode laminated one above another, the positive electrode current collector including a first positive electrode end portion and a second positive electrode end portion disposed at an opposite end to the first positive electrode end portion in a width direction of the positive electrode current collector, and a positive electrode mixture layer non-forming portion, in which the positive electrode mixture layer is not disposed, being provided only at a side of the first positive electrode end portion, the negative electrode current collector including a first negative electrode end portion and an opposite second negative electrode end portion disposed in a width direction of the negative electrode current collector, and a negative electrode mixture layer non-forming portion, in which the negative electrode mixture layer is not disposed, being provided only at a side of the first negative electrode end portion, the first positive electrode end portion and the first negative electrode end portion being disposed so as to exist at opposite sides from each other in the width direction, both width-direction ends of the positive electrode mixture layer being positioned more inward in the width direction than both width-direction ends of the negative electrode mixture layer, and an insulation layer containing the insulation particles being formed on a side surface of the second negative electrode end portion so as to cover the side surface of the second negative electrode end portion.

An electrode body manufacturing method according to a second aspect of the invention, includes: forming a positive electrode by coating a positive electrode mixture layer on a strip-shaped positive electrode current collector, which includes a first positive electrode end portion and a second positive electrode end portion disposed at an opposite end to the first positive electrode end portion in a width direction, such that a positive electrode mixture layer non-forming portion, in which the positive electrode mixture layer is not disposed, is provided only at a side of the first positive electrode end portion; forming a negative electrode by coating a negative electrode mixture layer on a strip-shaped negative electrode current collector, which includes a first negative electrode end portion and a second negative electrode end portion disposed at an opposite end to the first negative electrode end portion in a width direction, such that a negative electrode mixture layer non-forming portion, in which the negative electrode mixture layer is not disposed, is provided only at a side of the first negative electrode end portion, and coating insulation particles on the negative electrode mixture layer and a side surface of the second negative electrode end portion; and laminating the positive electrode and the negative electrode such that the first positive electrode end portion and the first negative electrode end portion are disposed at opposite sides from each other in the width direction and such that both width-direction ends of the positive electrode mixture layer are positioned more inward in the width direction than both width-direction ends of the negative electrode mixture layer.

In the electrode body and the electrode body manufacturing method according to the respective aspects described above, the insulation layer is formed so as to cover the side surface of the width-direction end of the negative electrode. Therefore, even when the width-direction end of the negative electrode is disposed so as to face the positive electrode mixture layer non-forming portion of the positive electrode current collector in the lamination direction, it is possible to restrain the end portion of the negative electrode from making contact with the positive electrode mixture layer non-forming portion of the positive electrode current collector. Accordingly, it is possible to restrain the positive electrode and the negative electrode from being short-circuited.

According to the respective aspects described above, it is possible to provide an electrode body and an electrode body manufacturing method which are capable of suppressing a short circuit between a positive electrode and a negative electrode even when an insulation layer is formed using insulation particles.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14 is a table showing the presence or absence of a short circuit at the time of welding current collectors, the presence or absence of a short circuit at the time of crushing, and the capacity retention rate, of respective samples;

DETAILED DESCRIPTION OF EMBODIMENTS

Figure 1:
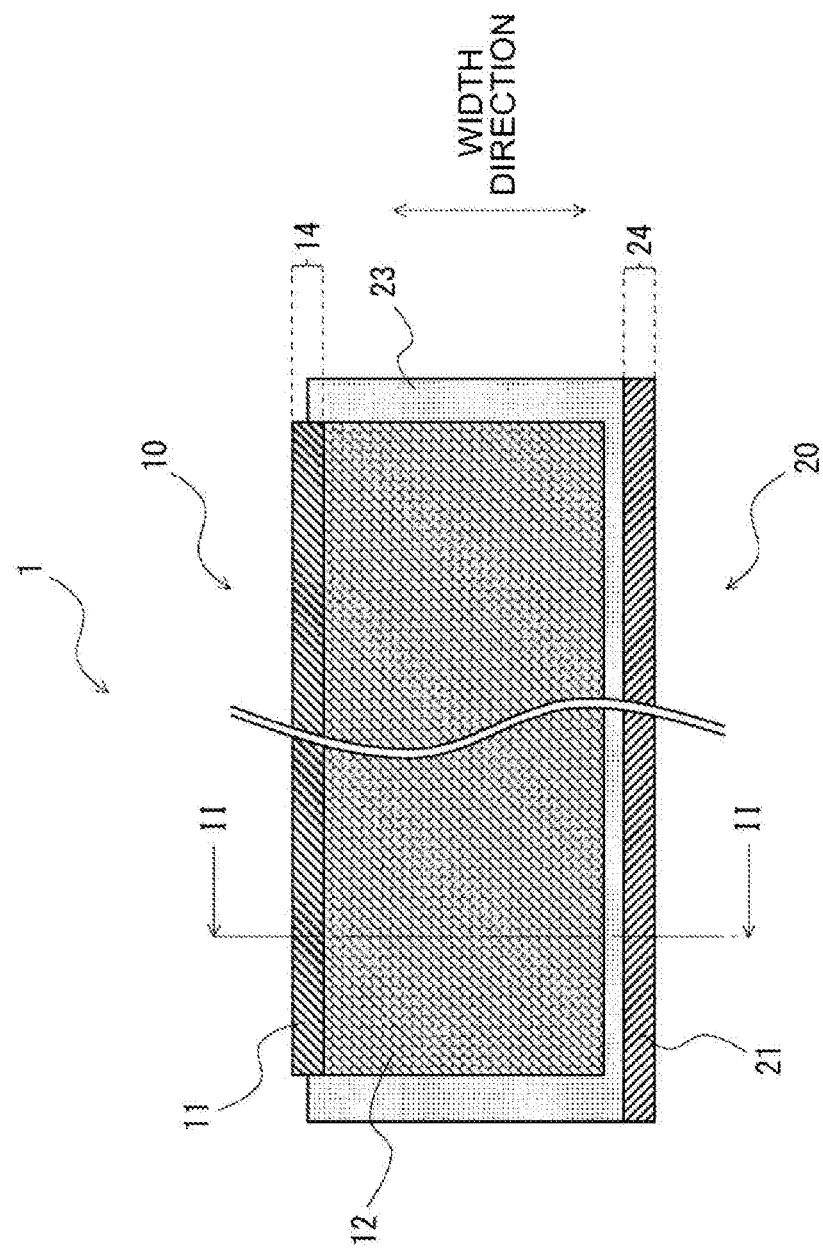
FIG. 1 is a top view for explaining an electrode body according to an embodiment.
Figure 2:
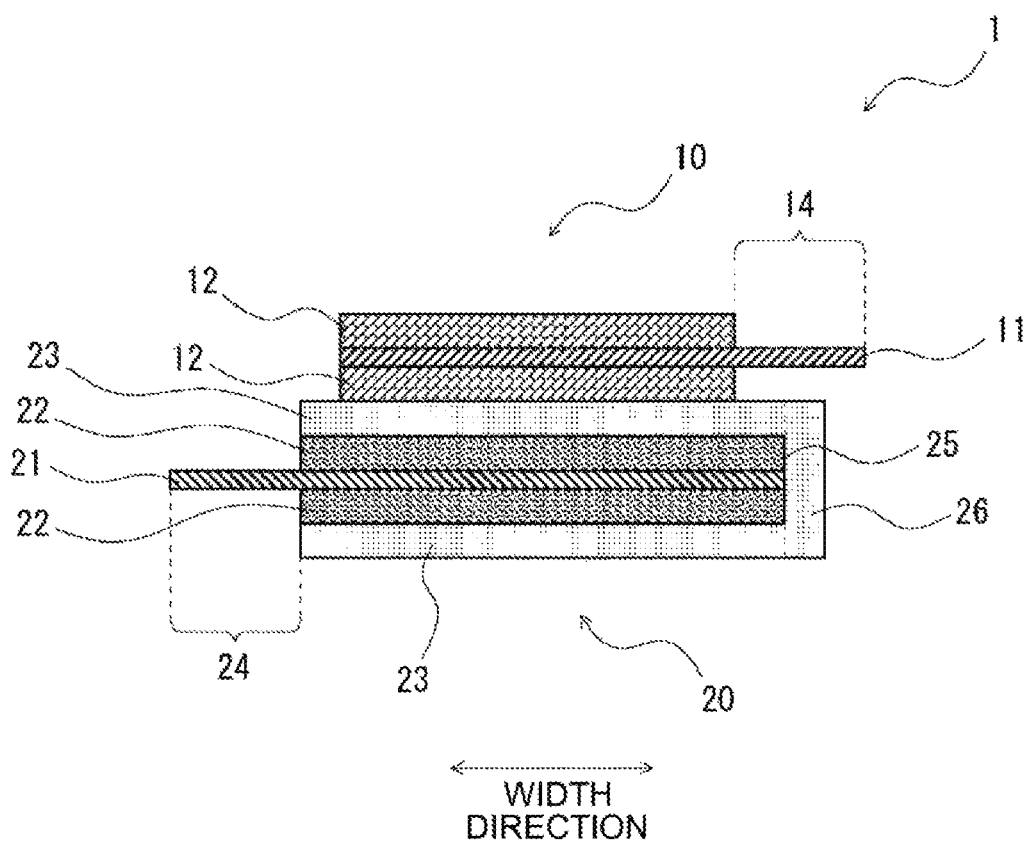
FIG. 2 is a sectional view taken along cut line II-II in the electrode body illustrated in FIG. 1.

Embodiments of the invention will now be described with reference to the drawings. FIG. 1 is a top view for explaining an electrode body 1 according to an embodiment. FIG. 1 is a top view illustrating the states of a positive electrode (positive electrode sheet) 10 and a negative electrode (negative electrode sheet) 20 available before the electrode body 1 is wound. FIG. 2 is a sectional view taken along cut line II-II in the electrode body 1 illustrated in FIG. 1. As illustrated in FIG. 1, the electrode body 1 includes a strip-shaped positive electrode sheet 10 and a strip-shaped negative electrode sheet 20. The positive electrode sheet 10 and the negative electrode sheet 20 are laminated in the thickness direction.

The positive electrode sheet 10 includes a positive electrode current collector 11 and positive electrode mixture layers 12 disposed on the positive electrode current collector 11 (namely, on the opposite surfaces of the positive electrode current collector 11). A positive electrode mixture layer non-forming portion 14, on which the positive electrode mixture layers 12 are not disposed, is provided in one width-direction end of the positive electrode sheet 10 (the first positive electrode end portion; the upper side of the positive electrode sheet 10 illustrated in FIG. 1).

As the positive electrode current collector 11, it may be possible to use, for example, aluminum or alloy mainly composed of aluminum. The positive electrode mixture layers 12 include a positive electrode active material. The positive electrode active material is a material capable of storing or releasing lithium. As the positive electrode active material, it may be possible to use, for example, lithium cobalt oxide ($LiCoO_2$), lithium manganese oxide ($LiMn_2O_4$) and lithium nickel oxide ($LiNiO_2$). Furthermore, it may be possible to use a material obtained by mixing $LiCoO_2$, $LiMn_2O_4$ and $LiNiO_2$ in an arbitrary ratio and calcining them. Moreover, the positive electrode mixture layers 12 may include a conductive material. As the conductive material, it may be possible to use, for example, carbon black such as acetylene black (AB), Ketjen black or the like and graphite.

The positive electrode sheet 10 may be manufactured by, for example, kneading a positive electrode active material, a conductive material, a solvent and a binder, coating a kneaded positive electrode mixture on the positive electrode current collector 11 and drying the same. In this case, as the solvent, it may be possible to use, for example, an NMP (N-methyl-2-pyrrolidone) solution. Furthermore, as the binder, it may be possible to use, for example, polyvinylidene fluoride (PVdF), styrene butadiene rubber (SBR), polytetrafluoroethylene (PTFE) and carboxymethyl cellulose (CMC).

As illustrated in FIGS. 1 and 2, the negative electrode sheet 20 includes a negative electrode current collector 21, negative electrode mixture layers 22 disposed on the negative electrode current collector 21 (namely, on the opposite surfaces of the negative electrode current collector 21), and insulation layers 23 disposed on the negative electrode mixture layers 22 and containing resin particles. A negative electrode mixture layer non-forming portion 24, on which the negative electrode mixture layers 22 are not disposed, is provided in one width-direction end of the negative electrode sheet 20 (the first negative electrode end portion; the lower side of the negative electrode sheet 20 illustrated in FIG. 1).

As the negative electrode current collector 21, it may be possible to use, for example, copper, nickel or alloy thereof. The negative electrode mixture layers 22 include a negative electrode active material. The negative electrode active material is a material capable of storing or releasing lithium. As the negative electrode active material, it may be possible to use, for example, a powdery carbon material made of graphite or the like. The negative electrode sheet 20 may be manufactured by, for example, kneading a negative electrode active material, a conductive material, a solvent and a binder, coating a kneaded negative electrode mixture on the negative electrode current collector 21 and drying the same (This is similar to the manufacture of the positive electrode sheet 10).

The negative electrode sheet 20 according to the present embodiment further includes the insulation layers 23 disposed on the negative electrode mixture layers 22. The insulation layers 23 may be formed using insulation particles. As the insulation particles, it may be possible to use ceramic particles or resin particles. As the ceramic particles, it may be possible to use, for example, alumina particles. Furthermore, in the case where the insulation particles are thermally welded to each other as will be described later, thermoplastic resin particles are used. For example, polyethylene particles may be used as the thermoplastic resin particles. When forming the insulation layers 23 on the negative electrode mixture layers 22, it may be possible to use, for example, a gravure coating apparatus (the details of which will be described later). The insulation layers 23 serve as separators that prevent the positive electrode sheet 10 and the negative electrode sheet 20 from being short-circuited when the positive electrode sheet 10 and the negative electrode sheet 20 are laminated.

As illustrated in FIG. 2, the positive electrode sheet 10 and the negative electrode sheet 20 are disposed such that the positive electrode mixture layer non-forming portion 14 of the positive electrode current collector 11 and the negative electrode mixture layer non-forming portion 24 of the negative electrode current collector 21 are opposite to each other in the width direction. Furthermore, the width of the negative electrode mixture layers 22 is larger than the width of the positive electrode mixture layers 12. Thus, the width-direction end 25 of the negative electrode sheet 20 is disposed so as to face the positive electrode mixture layer non-forming portion 14 of the positive electrode current collector 11 in the lamination direction. In other words, the width-direction end 25 of the negative electrode sheet 20 is disposed so as to overlap with the positive electrode mixture layer non-forming portion 14 of the positive electrode current collector 111 when seen in a plan view from the lamination direction.

In the electrode body 1 according to the present embodiment, an insulation layer 26 is formed so as to cover a side surface of the width-direction end 25 of the negative electrode sheet 20. By covering the side surface of the width-direction end 25 of the negative electrode sheet 20 with the insulation layer 26 in this way, it is possible to restrain the end portion 25 of each of the negative electrode mixture layers 22 from making contact with the positive electrode mixture layer non-forming portion 14 of the positive electrode current collector 11.

Figure 16:
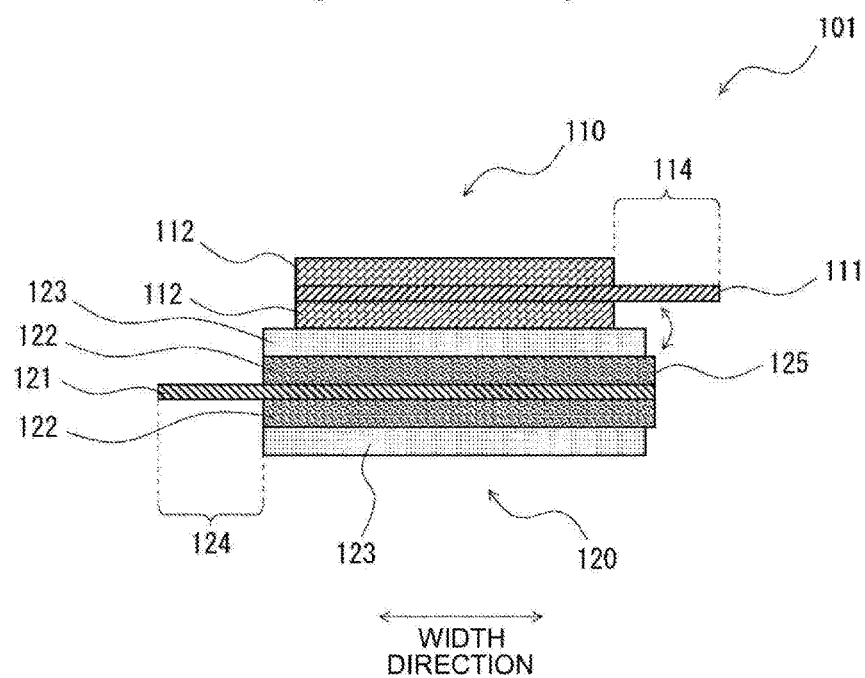
FIG. 16 is a sectional view taken along cut line XVI-XVI in the electrode body illustrated in FIG. 15.

That is to say, in the conventional electrode body 101 illustrated in FIG. 16, the side surface of the end portion 125 of each of the negative electrode mixture layers 122 is kept exposed without being covered with the insulation layers 123. For that reason, if a load is applied to the electrode body 101 obtained by laminating the positive electrode sheet 110 and the negative electrode sheet 120, the end portion 125 of each of the negative electrode mixture layers 122 may make contact with the positive electrode mixture layer non-forming portion 114 of the positive electrode current collector 111 (as indicated by an arrow in FIG. 16). This poses a problem in that the positive electrode sheet 110 and the negative electrode sheet 120 are short-circuited.

In contrast, in the electrode body 1 according to the present embodiment, as illustrated in FIG. 2, the insulation layer 26 is formed so as to cover the side surface of the width-direction end 25 of the negative electrode sheet 20. It is therefore possible to restrain the end portion 25 of each of the negative electrode mixture layers 22 from making contact with the positive electrode mixture layer non-forming portion 14 of the positive electrode current collector 11. Accordingly, it is possible to restrain the positive electrode sheet 10 and the negative electrode sheet 20 from being short-circuited.

Figure 3:
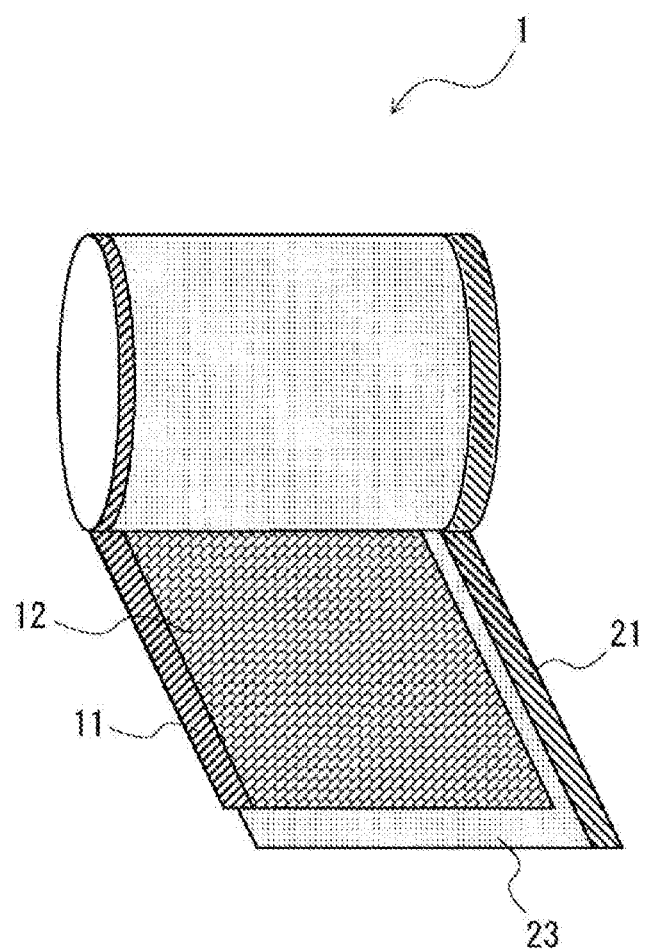
FIG. 3 is a perspective view illustrating a state in which the electrode body according to the embodiment is being wound.
Figure 4:
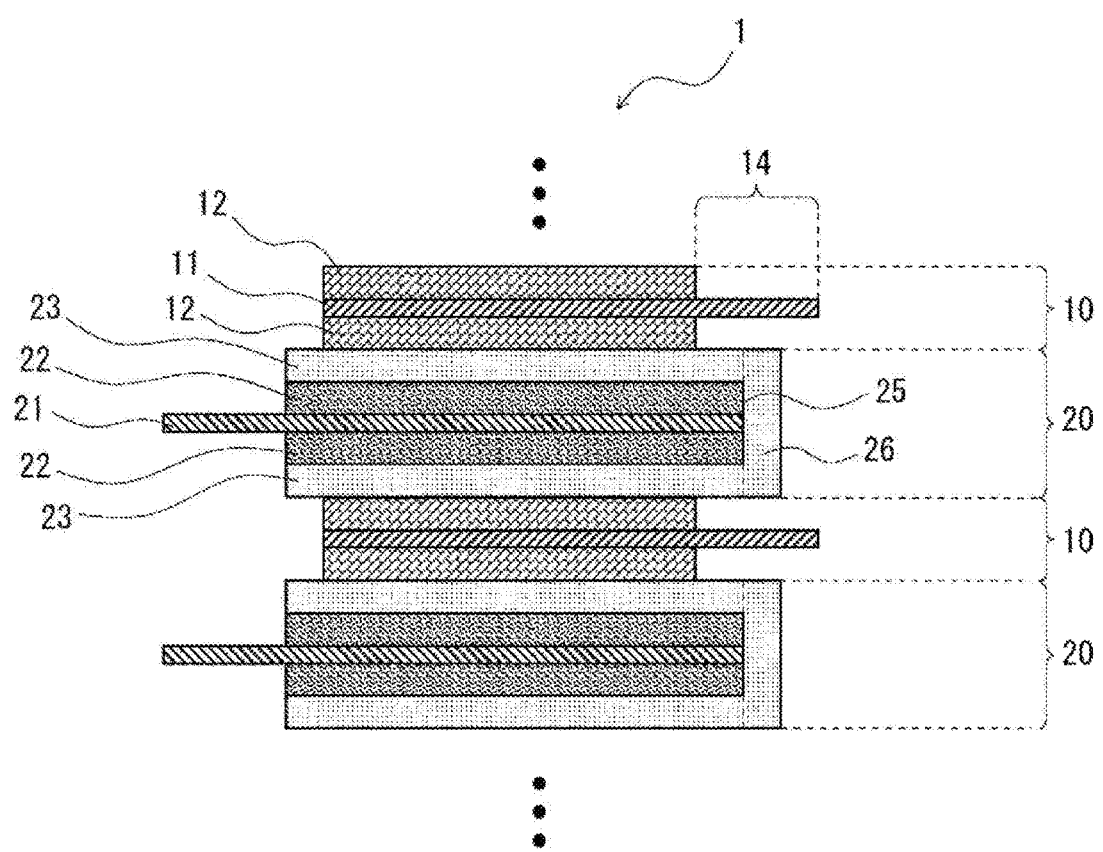
FIG. 4 is a sectional view illustrating one example of the electrode body according to the embodiment.

For example, in the present embodiment, a wound electrode body may be formed by winding the positive electrode sheet 10 and the negative electrode sheet 20 as illustrated in FIG. 3 after laminating the positive electrode sheet 10 and the negative electrode sheet 20 as illustrated in FIG. 1. Furthermore, for example, an electrode body may be formed by alternately laminating a plurality of positive electrode sheets 10 and a plurality of negative electrode sheets 20 as illustrated in FIG. 4. Even when the wound electrode body is formed by winding the positive electrode sheet 10 and the negative electrode sheet 20, the electrode body has a structure in which a plurality of positive electrode sheets 10 and a plurality of negative electrode sheets 20 are alternately laminated as illustrated in FIG. 4. In the present embodiment, the insulation layer 26 is formed on the side surface of the width-direction end 25 of the negative electrode sheet 20. Therefore, even if a load is applied to the end portion 25 of the negative electrode sheet 20 when winding the positive electrode sheet 10 and the negative electrode sheet 20 or when collecting and welding the positive electrode mixture layer non-forming portion 14 of the positive electrode current collector 11, it is possible to restrain the positive electrode sheet 10 and the negative electrode sheet 20 from being short-circuited.

Figure 5:
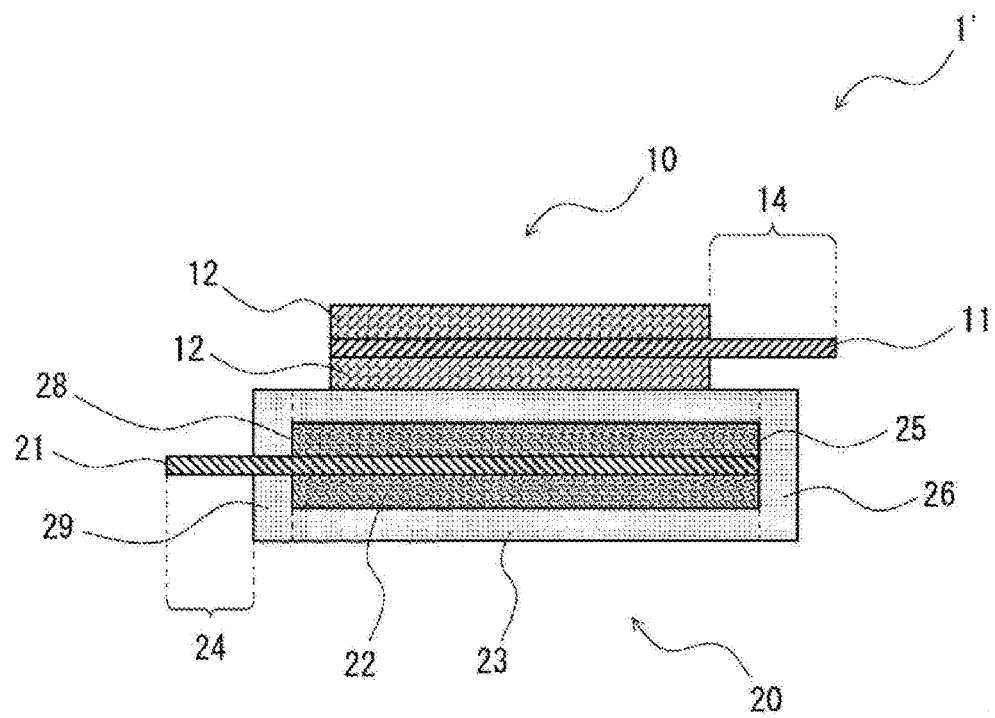
FIG. 5 is a sectional view illustrating another configuration example of the electrode body according to the embodiment.

Furthermore, in the present embodiment, as with an electrode body 1' illustrated in FIG. 5, an insulation layer 29 may be formed so as to cover the end portion side surfaces 28 of the negative electrode mixture layers 22 (namely, the end portion side surfaces existing at the side of the negative electrode mixture layer non-forming portion 24 of the negative electrode current collector 21). That is to say, when the end portion side surfaces 28 of the negative electrode mixture layers 22 are exposed as in the electrode body 1 illustrated in FIG. 2, there is a possibility that the end portion side surfaces 28 of the negative electrode mixture layers 22 and the positive electrode sheet 10 may be short-circuited upon entry of a conductive foreign material. Thus, by additionally forming the insulation layer 29 so as to cover the end portion side surfaces 28 of the negative electrode mixture layers 22, it is possible to reliably suppress a short circuit between the positive electrode sheet 10 and the negative electrode sheet 20.

Figure 6:
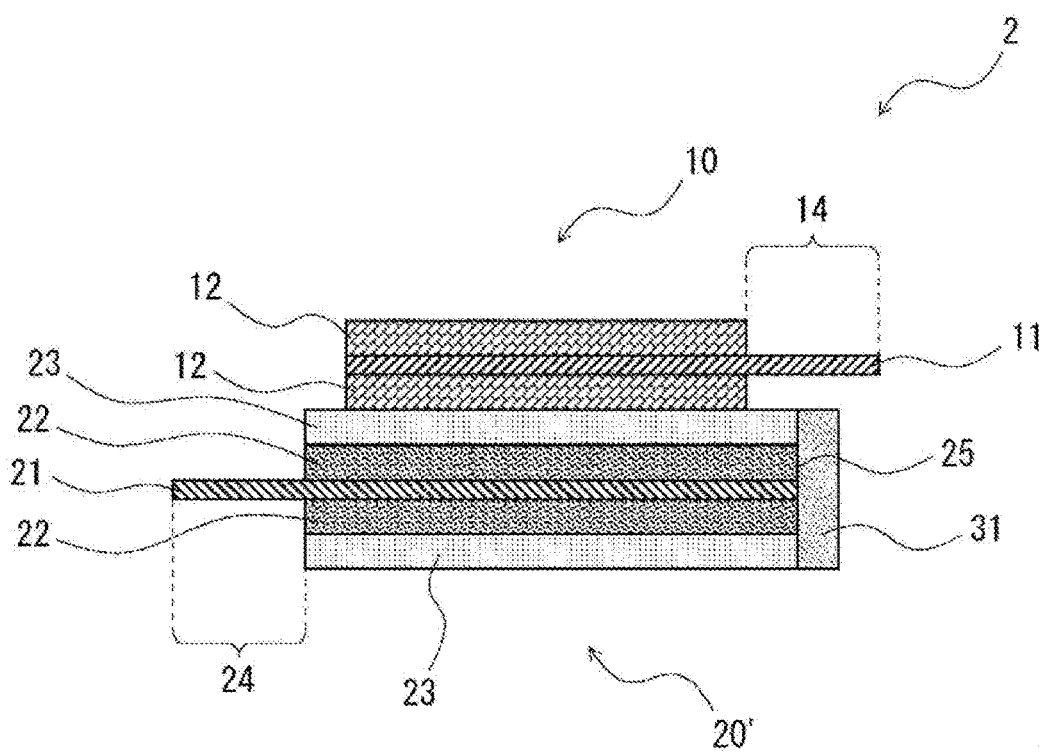
FIG. 6 is a sectional view illustrating a further configuration example of the electrode body according to the embodiment.

Furthermore, in the present embodiment, as with an electrode body 2 illustrated in FIG. 6, an insulation layer 31 may be formed by thermally welding the insulation particles which cover the side surface of a width-direction end 25 of a negative electrode sheet 20'. In this case, thermoplastic resin particles are used as the insulation particles. For example, polyethylene particles may be used as the resin particles. Since the polyethylene particles have a low melting point (of about 130° C.), it is possible to lower the thermal welding temperature.

In the case where the insulation layer 31 is formed by thermally welding the insulation particles which cover the side surface of the width-direction end 25 of the negative electrode sheet 20' as mentioned above, it is possible to make the connection between the insulation particles in the insulation layer 31 strong. It is therefore possible to increase the crushing strength. It is also possible to restrain the burrs (debris of the positive electrode current collector which is metal), which are generated when cutting the positive electrode current collector 11, from breaking through the insulation layer 23. Accordingly, it is possible to reliably suppress a short circuit between a positive electrode and a negative electrode.

Figure 7:
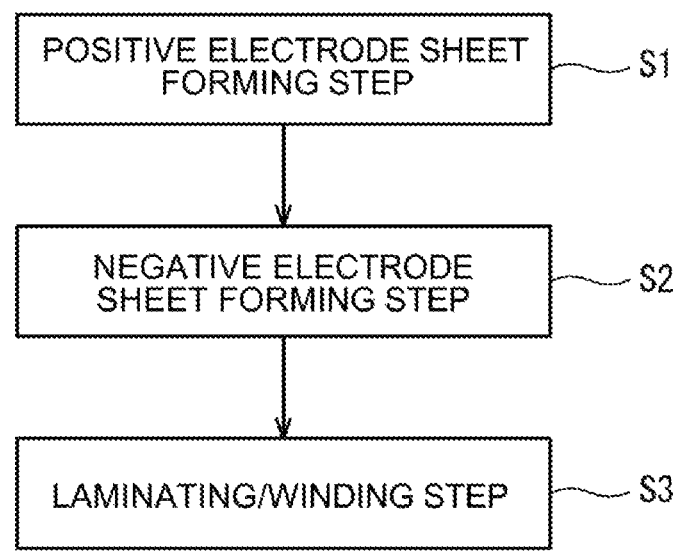
FIG. 7 is a flowchart for explaining an electrode body manufacturing method according to an embodiment.

Next, descriptions will be made on an electrode body manufacturing method according to the present embodiment. FIG. 7 is a flowchart for explaining an electrode body manufacturing method according to the present embodiment. When manufacturing an electrode body, a positive electrode sheet 10 is first formed (Step S1). The positive electrode sheet 10 can be manufactured by kneading a positive electrode active material, a conductive material, a solvent and a binder, coating a kneaded positive electrode mixture on the opposite surfaces of a positive electrode current collector 11 and drying the same. At this time, a positive electrode mixture layer non-forming portion 14, on which positive electrode mixture layers 12 are not disposed, is provided in one width-direction end of the positive electrode sheet 10 (the first positive electrode end portion; the upper side of the positive electrode sheet 10 illustrated in FIG. 1).

Then, a negative electrode sheet 20 is formed (Step S2). The negative electrode sheet 20 may be manufactured by kneading a negative electrode active material, a conductive material, a solvent and a binder, coating a kneaded negative electrode mixture on the opposite surfaces of the negative electrode current collector 21 and drying the same. At this time, a negative electrode mixture layer non-forming portion 24, on which negative electrode mixture layers 22 are not disposed, is provided in one width-direction end of the negative electrode sheet 20 (the first negative electrode end portion; the lower side of the negative electrode sheet 20 illustrated in FIG. 1).

Figure 8:
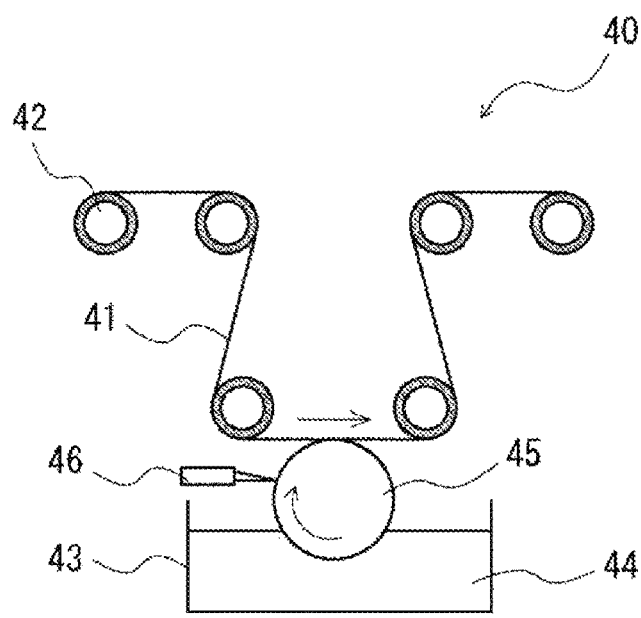
FIG. 8 is a view for explaining a step of coating insulation particles on a negative electrode using a gravure coating apparatus.
Figure 9:
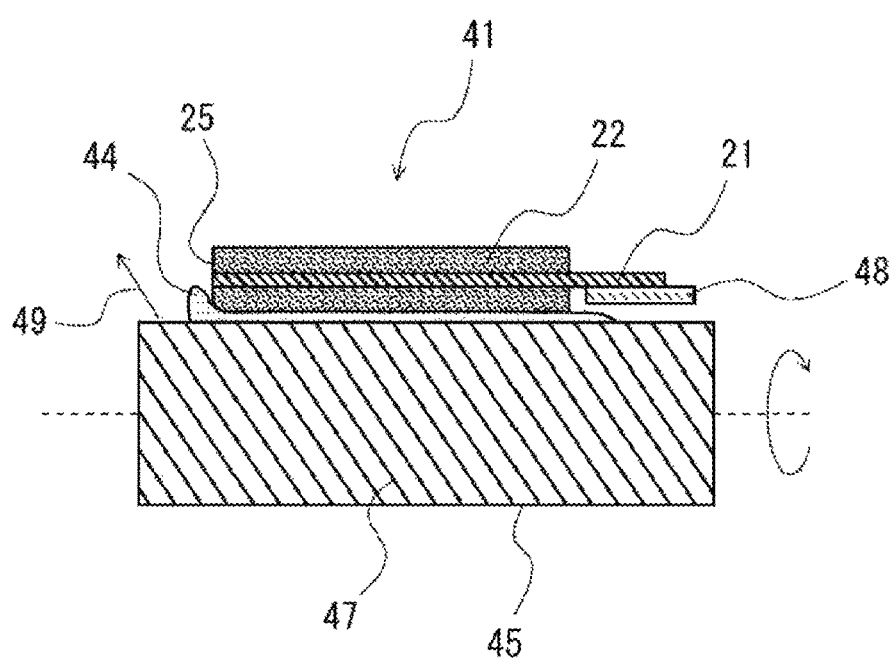
FIG. 9 is a view for explaining a step of coating insulation particles on a negative electrode using a gravure coating apparatus.

In the present embodiment, insulation layers 23 are additionally formed on the negative electrode mixture layers 22. At this time, an insulation layer 26 containing insulation particles is formed so as to cover the side surface of the width-direction end 25 of the negative electrode sheet 20 (see FIG. 2). When forming the insulation layers 23, insulation particles are coated on the negative electrode mixture layers 22 using, for example, a gravure coating apparatus. FIGS. 8 and 9 are views for explaining a step of coating the insulation particles on the negative electrode sheet using the gravure coating apparatus 40. FIG. 9 is a view in which the gravure coating apparatus 40 illustrated in FIG. 8 is seen from the upstream side in the conveying direction of the negative electrode sheet 41 (namely, from the left side of the drawing sheet surface in FIG. 8).

As illustrated in FIG. 8, the gravure coating apparatus 40 includes a plurality of rollers 42, a liquid tank 43, a gravure roll 45 and a doctor blade 46. The rollers 42 convey the negative electrode sheet 41, on which the negative electrode mixture layers 22 are formed, in the conveying direction (indicated by an arrow in FIG. 8). The liquid tank 43 retains a paste 44 containing insulation particles and supplies the paste 44 to the outer circumferential surface of the gravure roll 45. The paste 44 containing insulation particles may be produced by, for example, mixing insulation particles, a solvent and a thickener. The gravure roll 45 transfers and coats the paste 44 onto the surface of the negative electrode sheet 41 (namely, the surface of one of the negative electrode mixture layers 22). The doctor blade 46 scrapes off the excess paste 44 adhering to the outer circumferential surface of the gravure roll 45.

As illustrated in FIG. 9, the paste 44 held on the outer circumferential surface of the gravure roll 45 is coated on the surface of the negative electrode sheet 41 conveyed to the gravure roll 45. At this time, a masking tape 48 is provided in the negative electrode mixture layer non-forming portion of the negative electrode current collector 21. This makes it possible to prevent the paste 44 from being coated on the negative electrode mixture layer non-forming portion of the negative electrode current collector 21. Furthermore, as illustrated in FIG. 9, the direction of grooves 47 of the gravure roll 45 is inclined so as to face toward the end portion 25 of the negative electrode sheet 41. This enables the paste 44 to flow in the direction extending along the grooves 47 (in the direction indicated by an arrow 49 in FIG. 9). Thus, it is possible to coat the paste 44 on the side surface of the end portion 25 of the negative electrode sheet 41.

Thereafter, by drying the paste 44 coated on the negative electrode sheet 41, it is possible to form an insulation-particle-containing insulation layer 23 on one of the negative electrode mixture layers 22. The step of coating the insulation particles (the insulation layer 23) on the surface of the negative electrode sheet 41 using the gravure coating apparatus 40 is performed on both surfaces of the negative electrode sheet 41.

After the positive electrode sheet 10 and the negative electrode sheet 20 are manufactured in the aforementioned manner, the positive electrode sheet 10 and the negative electrode sheet 20 are laminated (Step S3 in FIG. 7). When laminating the positive electrode sheet 10 and the negative electrode sheet 20, as illustrated in FIG. 2, the positive electrode sheet 10 and the negative electrode sheet 20 are disposed such that the positive electrode mixture layer non-forming portion 14 of the positive electrode current collector 11 and the negative electrode mixture layer non-forming portion 24 of the negative electrode current collector 21 are opposite to each other in the width direction. After laminating the positive electrode sheet 10 and the negative electrode sheet 20, a wound electrode body can be formed by winding the positive electrode sheet 10 and the negative electrode sheet 20 as illustrated in FIG. 3. Alternatively, as illustrated in FIG. 4, an electrode body may be formed by alternatively laminating a plurality of positive electrode sheets 10 and a plurality of negative electrode sheets 20. In the flowchart illustrated in FIG. 7, a case is illustrated, in which the positive electrode sheet 10 is formed prior to the negative electrode sheet 20. However, the order of forming the positive electrode sheet 10 and the negative electrode sheet 20 may be reversed.

In the present embodiment, as with the electrode body 2 illustrated in FIG. 6, the insulation layer 31 may be formed by thermally welding the insulation particles which cover the side surface of the width-direction end 25 of the negative electrode sheet 20'. A method of manufacturing the negative electrode sheet 20 in the case of thermally welding the insulation particles will be described with reference to FIGS. 10 to 13.

Figure 10A:
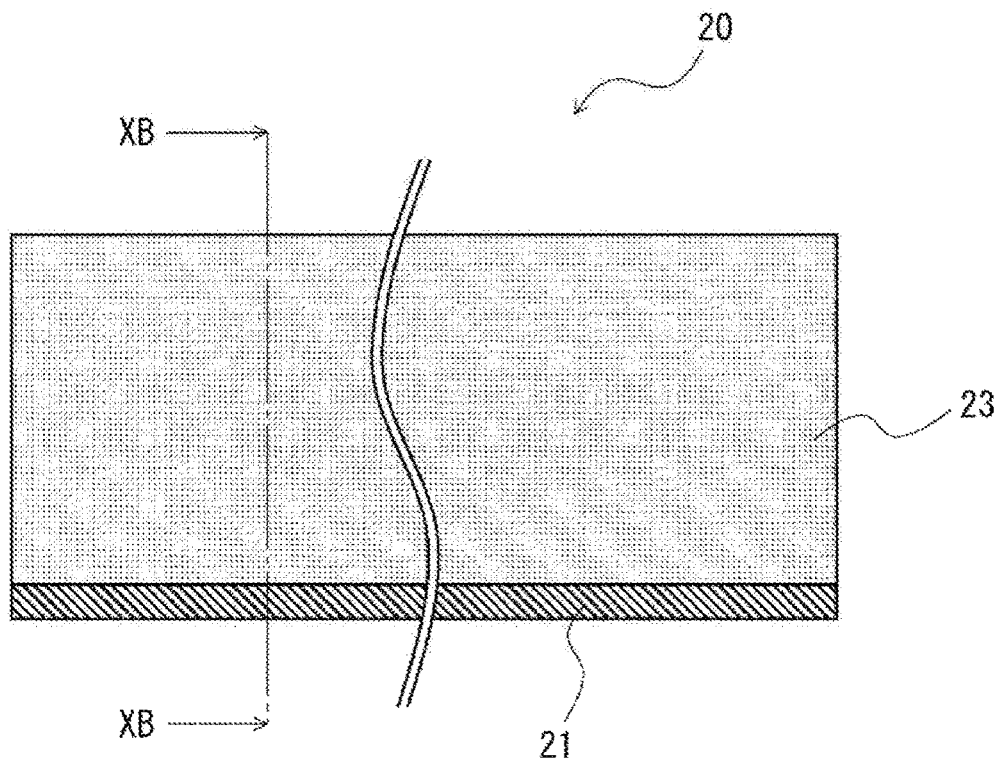
FIG. 10A is a top view for explaining a step of manufacturing the negative electrode of the electrode body according to the embodiment.
Figure 10B:
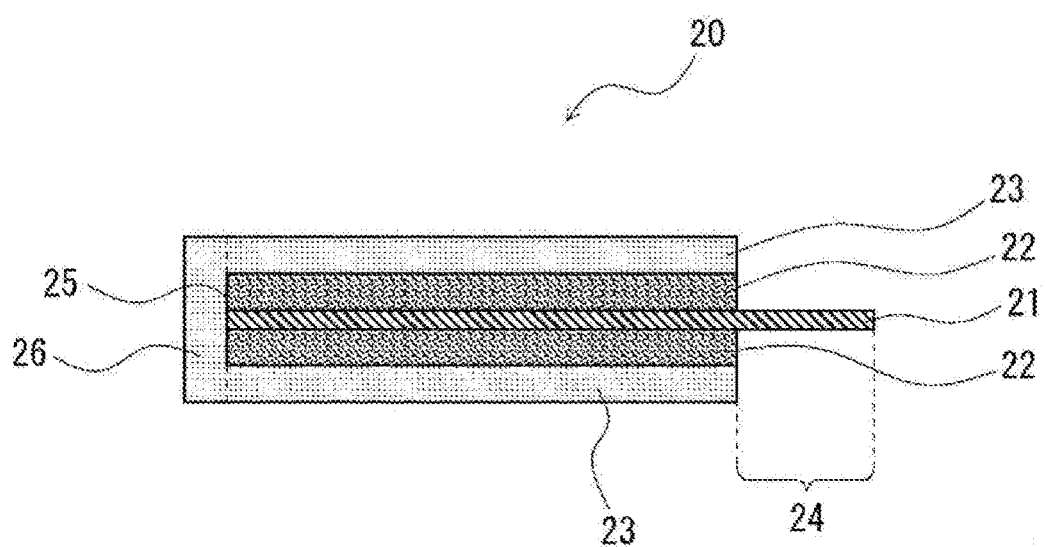
FIG. 10B is a sectional view taken along cut line XB-XB in the negative electrode illustrated in FIG. 10A.

First, as illustrated in FIGS. 10A and 10B, a negative electrode sheet 20 including a negative electrode current collector 21, negative electrode mixture layers 22 and insulation layers 23 and 26 is formed. In this case, thermoplastic resin particles are used as the insulation particles that constitute the insulation layers 23 and 26. For example, polyethylene particles may be used as the resin particles. A negative electrode mixture layer non-forming portion 24, on which the negative electrode mixture layers 22 are not disposed, is provided in one width-direction end of the negative electrode sheet 20. When forming the negative electrode sheet 20, it may be possible to use the method described at Step S2 in FIG. 7.

Figure 11A:
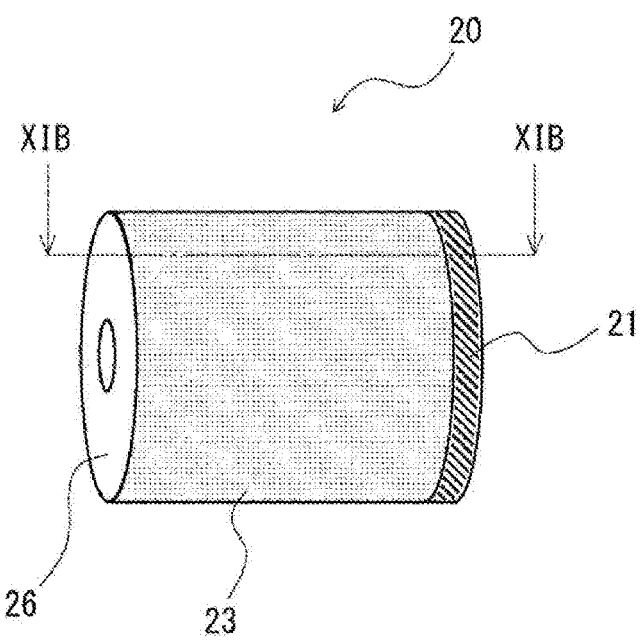
FIG. 11A is a perspective view for explaining a step of manufacturing the negative electrode of the electrode body according to the embodiment.
Figure 11B:
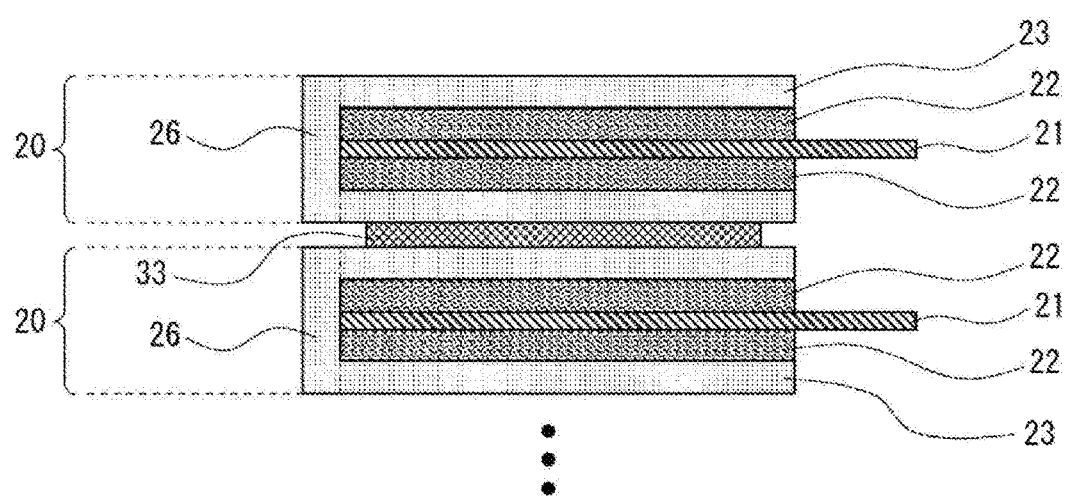
FIG. 11B is a sectional view taken along cut line XIB-XIB in the negative electrode illustrated in FIG. 11A.
Figure 12:
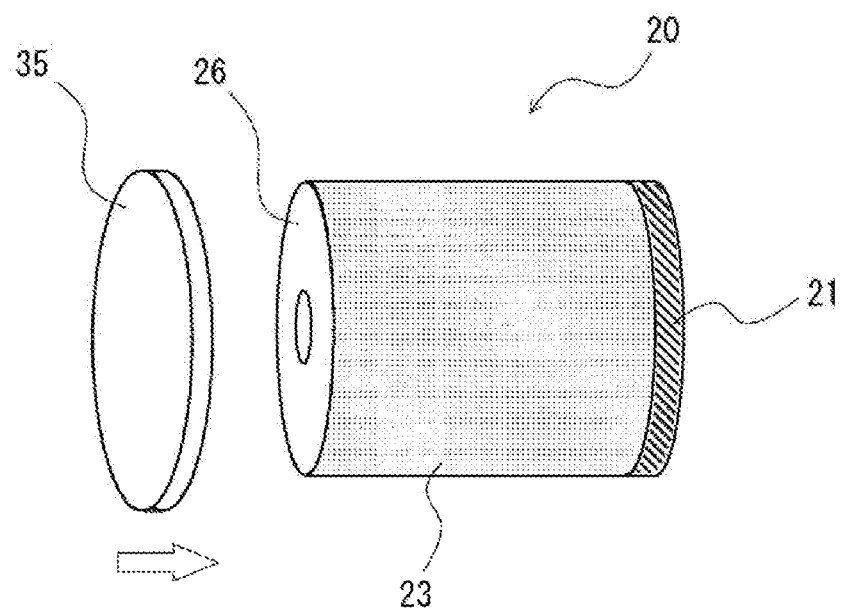
FIG. 12 is a perspective view for explaining a step of manufacturing the negative electrode of the electrode body according to the embodiment.

Thereafter, as illustrated in FIG. 11A, the negative electrode sheet 20 is wound. By winding the negative electrode sheet 20, the negative electrode sheet 20 is laminated as illustrated in FIG. 11B. At this time, a spacer 33 is provided so that the negative electrode sheets 20 are spaced apart from each other in the thickness direction (lamination direction) of the negative electrode sheet 20. Thereafter, as illustrated in FIG. 12, the resin particles are thermally welded by heating the insulation layer 26 of the end portion 25 of the wound negative electrode sheet 20 (see FIG. 10B). When thermally welding the insulation layer 26 (the resin particles), for example, a plate-shaped member 35 heated to a temperature equal to or higher than the melting point of the resin particles is pressed against the side surface of the end portion of the wound negative electrode sheet 20. This makes it possible to thermally weld only the resin particles existing on the side surface of the end portion of the negative electrode sheet 20.

Figure 13A:
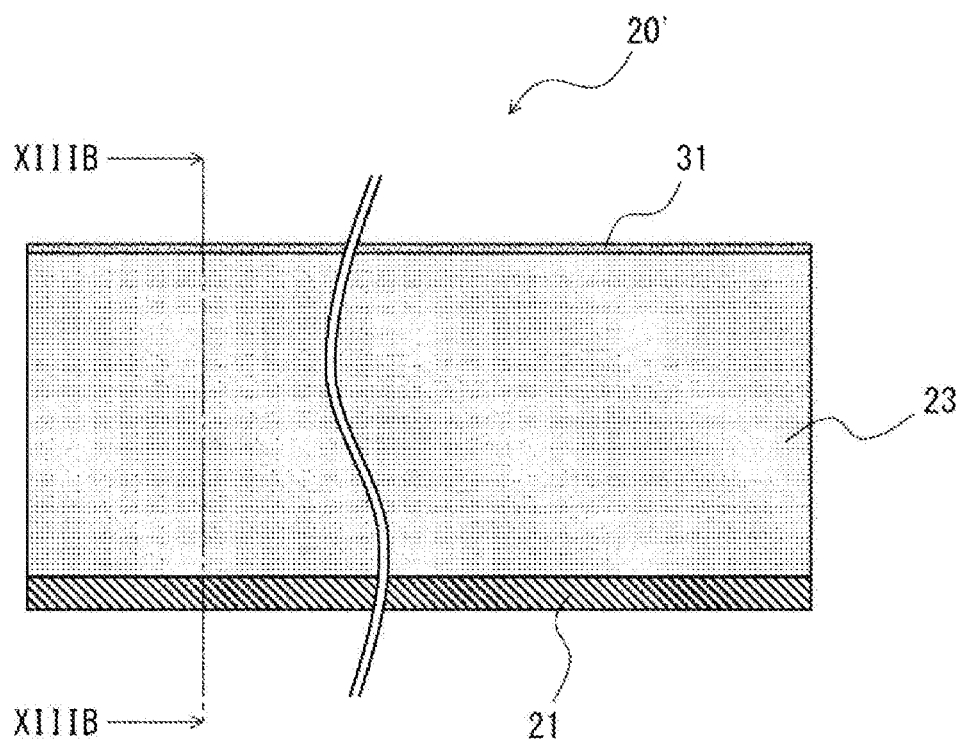
FIG. 13A is a top view for explaining a step of manufacturing the negative electrode of the electrode body according to the embodiment.

After the insulation layer 31 (the thermally-welded insulation layer designated by reference numeral 31) is formed by thermally welding the resin particles, the wound negative electrode sheet 20' (the thermally-welded negative electrode sheet designated by reference numeral 20') is unwound (see FIG. 13A). At this time, as illustrated in FIG. 11B, the spacer 33 is provided between the negative electrode sheet and the negative electrode sheet. It is therefore possible to prevent the insulation layers 31 form being thermally welded to each other and to easily unwind the wound negative electrode sheet 20'. By using this method, the insulation layer 31 in which the insulation particles are thermally welded to each other may be formed in the width-direction end 25 of the negative electrode sheet 20' (see FIG. 13B).

Figure 13B:
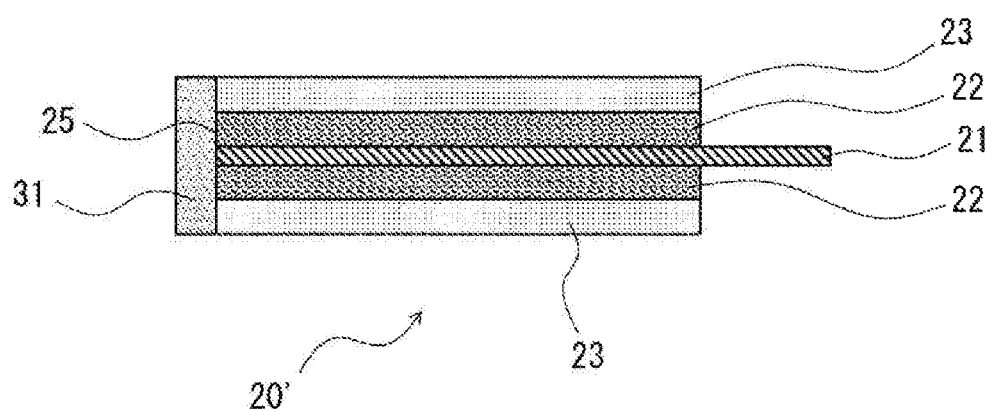
FIG. 13B is a sectional view taken along cut line XIIIB-XIIIB in the negative electrode illustrated in FIG. 13A.
Figure 15:
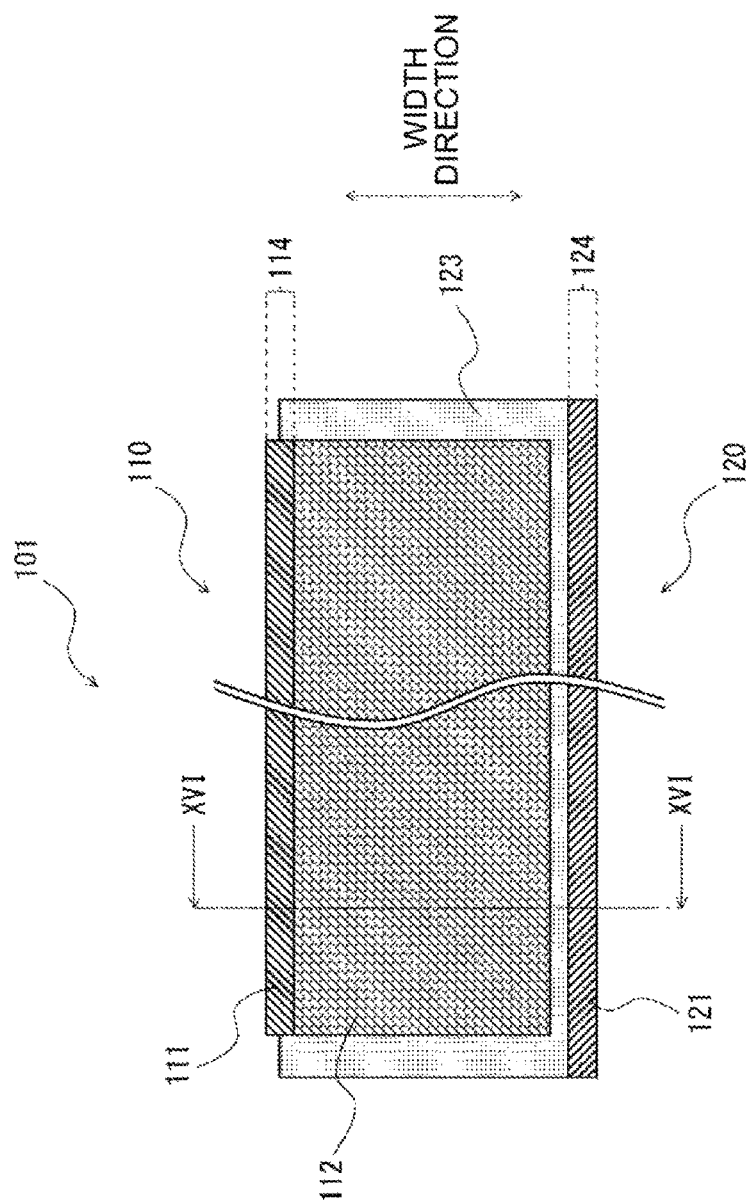
FIG. 15 is a top view for explaining a problem to be solved by the invention.

Then, by forming an electrode body using the negative electrode sheet 20' illustrated in FIGS. 13A and 13B, it is possible to form the electrode body 2 illustrated in FIG. 6, namely the electrode body 2 in which the width-direction end 25 of the negative electrode sheet 20' is covered with the insulation layer 31 (the insulation layer composed of the thermally-welded insulation particles).

According to the present embodiment described above, even when the insulation layer is formed using the insulation particles, it is possible to provide an electrode body and an electrode body manufacturing method which are capable of suppressing a short circuit between a positive electrode and a negative electrode.

Next, descriptions will be made on examples of the invention. An electrode body (wound electrode body) including a positive electrode sheet and a negative electrode sheet was manufactured using the method described above. At this time, an electrode body in which an insulation layer 26 is formed so as to cover the side surface of the width-direction end 25 of the negative electrode sheet 20, as with the electrode body 1 illustrated in FIG. 2, was manufactured in example 1. Furthermore, as with the electrode body 2 illustrated in FIG. 6, an insulation layer 31 was formed by thermally welding the insulation particles which cover the side surface of the width-direction end 25 of the negative electrode sheet 20'. The electrode body thus manufactured is example 2. In addition, as a comparative example, an electrode body (see FIG. 16) in which the side surface of the width-direction end 125 of the negative electrode sheet 120 is not covered with the insulation layer 123 was manufactured.

Then, after winding the positive electrode sheet and the negative electrode sheet, the positive electrode current collector (the positive electrode mixture layer non-forming portion) and the negative electrode current collector (the negative electrode mixture layer non-forming portion) were bundled and welded. Thereafter, the presence or absence of a short circuit between the positive electrode and the negative electrode was determined by measuring a resistance value of the electrode body, namely a resistance value between the positive electrode and the negative electrode. At this time, the determination reference value was 1 GΩ. That is to say, if the resistance value between the positive electrode and the negative electrode is equal to or larger than 1 GΩ, it is determined that a short circuit is absent. If the resistance value between the positive electrode and the negative electrode is smaller than 1 GΩ, it is determined that a short circuit is present.

Furthermore, the presence or absence of a short circuit was examined when a load (of 2 kN) is locally applied to the positive electrode mixture layer non-forming portion of the positive electrode current collector (see the positive electrode mixture layer non-forming portion 14 illustrated in FIG. 2). The definition of the short circuit is the same as above.

Moreover, lithium-ion secondary batteries were manufactured using the electrode bodies according to examples 1 and 2 and the comparative example. The capacity retention rate of each of the lithium-ion secondary batteries was measured. When measuring the capacity retention rate, 1000 cycles of charging and discharging were repeated at an environmental temperature of 60° C. and at a current value of 2 C. At this time, charging and discharging were repeated between 0% and 100% of an SOC (State of Charge). A value obtained by dividing the battery capacity available after 1000 cycles of charging and discharging by the battery capacity available at the initial charging and then multiplying the divided value by 100 was used as the capacity retention rate (%).

FIG. 14 shows the presence or absence of a short circuit at the time of welding the current collectors of the respective samples, the presence or absence of a short circuit at the time of crushing, and the capacity retention rate. As shown in FIG. 14, in the electrode body according to the comparative example, the positive electrode and the negative electrode were short-circuited at the time of welding the current collector and at the time of crushing. In the electrode body according to example 1, the positive electrode and the negative electrode were not short-circuited at the time of welding the current collector. However, the positive electrode and the negative electrode were short-circuited at the time of crushing. In the electrode body according to example 2, the positive electrode and the negative electrode were not short-circuited at the time of welding the current collector and at the time of crushing. Accordingly, by covering the side surface of the width-direction end 25 of the negative electrode sheet 20 with the insulation layer 26 or 31 as in examples 1 and 2, it is possible to suppress a short circuit between the positive electrode and the negative electrode. In particular, if the insulation layer 31 is formed by thermally welding the insulation particles as in example 2, it is possible to effectively suppress a short circuit between the positive electrode and the negative electrode (That is to say, it is possible to enable the insulation layer to endure the crushing).

Focusing on the capacity retention rate, in the case of using the electrode body according to example 1, the capacity retention rate was higher than the capacity retention rate available in the case of using the electrode body according to the comparative example. Presumably, this is because, in the electrode body according to example 1, due to the provision of the insulation layer 26 in the end portion 25 of the negative electrode sheet 20 (see FIG. 2), the insulation layer 26 is capable of holding an electrolyte and lithium ions are easily introduced from the end portion 25 of the negative electrode sheet 20. On the other hand, in the electrode body according to the comparative example, an insulation layer is not formed in the end portion 125 of the negative electrode sheet 120 (see FIG. 16). Thus, it may be presumed that lithium ions are hardly introduced from the end portion 125 of the negative electrode sheet 120.

In the case of using the electrode body according to example 2, the capacity retention rate was lower than the capacity retention rate available in the case of using the electrode body according to example 1. Presumably, this is because, in the electrode body according to example 2, due to the thermal welding of the insulation layer 31 provided in the end portion 25 of the negative electrode sheet 20 (see FIG. 6), the gap between the insulation particles constituting the insulation layer 31 is made narrow and lithium ions are hardly introduced from the end portion 25 of the negative electrode sheet 20.

As can be noted from the above results, when the capacity retention rate of a lithium-ion secondary battery is deemed important, it is desirable to employ the configuration of example 1. On the other hand, when the resistance against crushing is deemed more important than the capacity retention rate of a lithium-ion secondary battery, it is desirable to employ the configuration of example 2.

While the invention has been described above on the basis of the embodiments, the invention is not limited to only the configurations of the aforementioned embodiments. It goes without saying that the invention encompasses various kinds of modifications, changes and combinations that may be conceived by a person skilled in the art within the scope of the invention defined in the claims.

What is claimed is:

1. An electrode body for a non-aqueous electrolyte secondary battery, comprising:
    a positive electrode including a positive electrode current collector and a positive electrode mixture layer disposed on the positive electrode current collector; and
    a negative electrode including a negative electrode current collector, a negative electrode mixture layer disposed on an upper surface and a lower surface of the negative electrode current collector, and an insulation layer disposed on the negative electrode mixture layer, the insulation layer containing insulation particles, and the positive electrode and the negative electrode laminated one above another,
    the positive electrode current collector including a first positive electrode end portion and a second positive electrode end portion disposed at an opposite end to the first positive electrode end portion in a width direction of the positive electrode current collector, and a positive electrode mixture layer non-forming portion, in which the positive electrode mixture layer is not disposed, being provided only at a side of the first positive electrode end portion,
    the negative electrode current collector including a first negative electrode end portion and an opposite second negative electrode end portion disposed in a width direction of the negative electrode current collector, and a negative electrode mixture layer non-forming portion, in which the negative electrode mixture layer is not disposed, being provided only at a side of the first negative electrode end portion, the first positive electrode end portion and the first negative electrode end portion being disposed so as to exist at opposite sides from each other in the width direction, both width-direction ends of the positive electrode mixture layer being positioned more inward in the width direction than both width-direction ends of the negative electrode mixture layer, and the insulation layer containing the insulation particles being formed on an end portion side surface of the second negative electrode end portion so as to cover the end portion side surface of the second negative electrode end portion, wherein the end portion side surface extends from an edge of the upper surface to an edge of the lower surface of the negative electrode current collector, and wherein the insulation particles are thermoplastic resin particles and are thermally welded to each other on the end portion side surface of the second negative electrode end portion.

2. The electrode body according to claim 1, wherein the insulation particles are polyethylene particles.

3. The electrode body according to claim 1, wherein an insulation layer containing the insulation particles is additionally formed on the negative electrode current collector so as to cover an end portion side surface of the negative electrode mixture layer existing at a side of the negative electrode mixture layer non-forming portion.

4. The electrode body according to claim 1, wherein the electrode body is a wound electrode body formed by laminating and winding the positive electrode and the negative electrode.

5. An electrode body manufacturing method, comprising:

forming a positive electrode by coating a positive electrode mixture layer on a strip-shaped positive electrode current collector, which includes a first positive electrode end portion and a second positive electrode end portion disposed at an opposite end to the first positive electrode end portion in a width direction, such that a positive electrode mixture layer non-forming portion, in which the positive electrode mixture layer is not disposed, is provided only at a side of the first positive electrode end portion;

forming a negative electrode by coating a negative electrode mixture layer on an upper surface and a lower surface of a strip-shaped negative electrode current collector, which includes a first negative electrode end portion and a second negative electrode end portion disposed at an opposite end to the first negative electrode end portion in a width direction, such that a negative electrode mixture layer non-forming portion, in which the negative electrode mixture layer is not disposed, is provided only at a side of the first negative electrode end portion, and coating insulation particles on the negative electrode mixture layer and an end portion side surface of the second negative electrode end portion, wherein the end portion side surface extends from an edge of the upper surface to an edge of the lower surface of the negative electrode current collector; and laminating the positive electrode and the negative electrode such that the first positive electrode end portion and the first negative electrode end portion are disposed at opposite sides from each other in the width direction and such that both width-direction ends of the positive electrode mixture layer are positioned more inward in the width direction than both width-direction ends of the negative electrode mixture layer, wherein the forming the negative electrode comprises:

coating thermoplastic resin particles as the insulation particles and winding the negative electrode on which the resin particles are coated; and heating the side surface of the second negative electrode end portion of the wound negative electrode at a temperature equal to or higher than a melting point of the resin particles to thermally weld the resin particles existing on the end portion side surface of the second negative electrode end portion.

6. The method according to claim 5, wherein when thermally welding the resin particles, a plate-shaped member heated to a temperature equal to or higher than the melting point of the resin particles is pressed against the end portion side surface of the second negative electrode end portion of the wound negative electrode.

7. The method according to claim 5, wherein when winding the negative electrode, a spacer is provided so that the negative electrodes are spaced apart from each other in a thickness direction of the negative electrode.

8. The method according to claim 5, further comprising:

winding the positive electrode and the negative electrode after laminating the positive electrode and the negative electrode.

* * * * *